(No Model.)
C. E. P. HOBART.
PLANTER.
No. 523,525. Patented July 24, 1894.
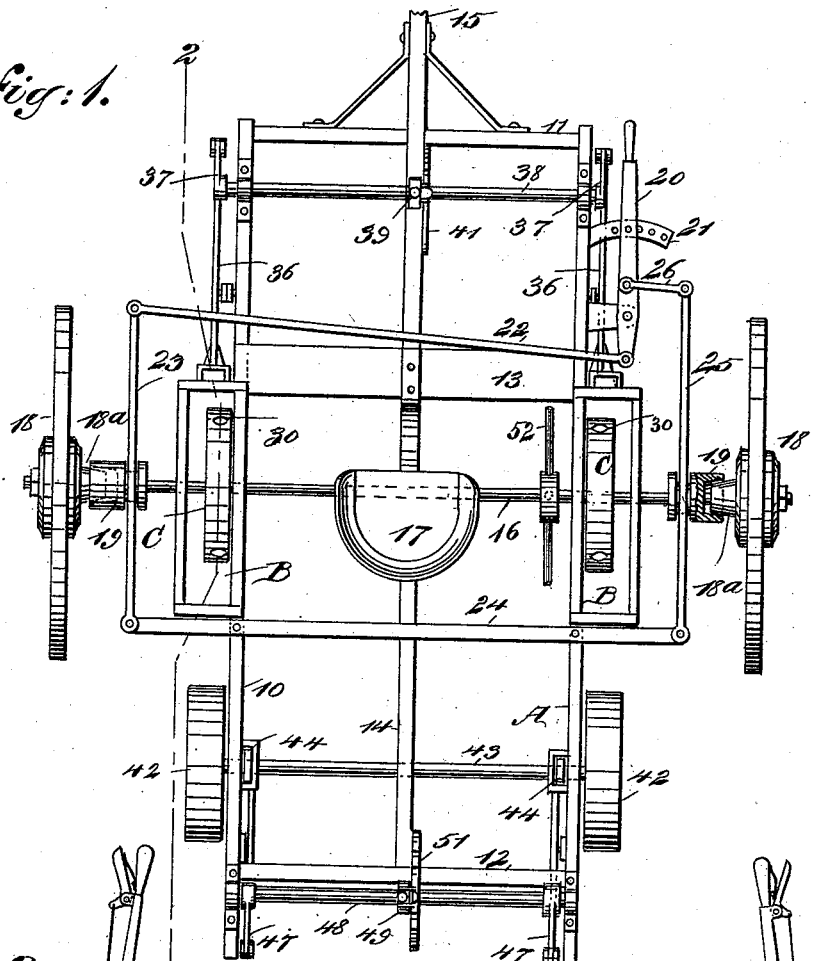
Fig: 1.
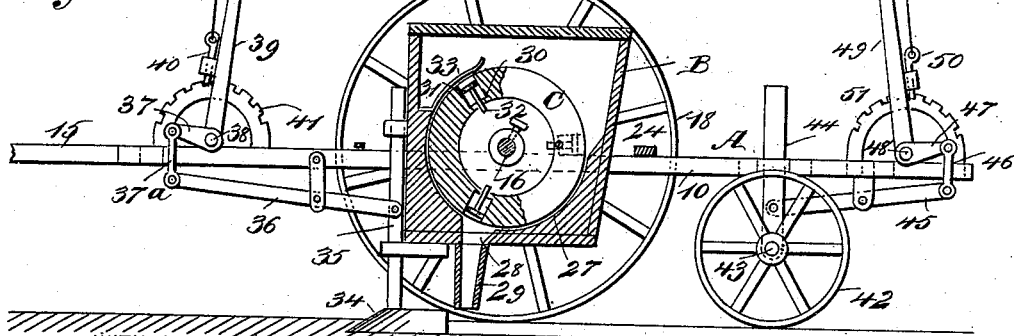
Fig: 2.
WITNESSES:
Chas. Nida.
C. Sedgwick
INVENTOR
C. E. P. Hobart
BY Munn & Co
ATTORNEYS.

UNITED STATES PATENT OFFICE.

CALEB E. P. HOBART, OF CHEROKEE, IOWA.

PLANTER.

SPECIFICATION forming part of Letters Patent No. 523,525, dated July 24, 1894.

Application filed January 26, 1894. Serial No. 498,118. (No model.)

*To all whom it may concern:*

Be it known that I, CALEB ELIPHALET PACKARD HOBART, of Cherokee, in the county of Cherokee and State of Iowa, have invented a new and Improved Planter, of which the following is a full, clear, and exact description.

My invention relates to an improvement in planters, and it has for its object to provide a machine especially adapted for planting corn, and to combine in one machine a corn planter and a corn drill.

A further object of the invention is to provide a machine of the above description, through the medium of which large and small fields may be planted in perfect squares without the use of cross markers, measuring chains or their equivalents, and likewise to provide a means whereby through the operation of the machine, the width of the rows apart will be made to correspond to the distance between the hills, by simply adjusting the droppers.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 a plan view of the machine; and Fig. 2 is a section taken longitudinally and vertically through the machine, practically on the line 2—2 of Fig. 1.

In carrying out the invention the frame A of the machine usually consists of two parallel side bars 10, a front cross bar 11, a rear cross bar 12, an intermediate cross bar 13, and a longitudinal central beam 14, which extends from front to rear of the frame, and may be continued at the front to form the tongue or pole 15.

Preferably at the central portion of the frame a seed box B, is secured to each side beam 10, the seed boxes being located upon the outer faces of the frame.

An axle 16, adapted to be used as a drive shaft, is journaled at the central portion of the machine, transversely thereof, and extends through and beyond each seed box, the driver's seat 17 being usually located over this axle.

A supporting wheel 18, is loosely mounted upon each end of the axle or drive shaft; and the hub of each wheel is provided with a conical section $18^a$ upon its inner face, as is best shown in Fig. 1, and said conical hub sections are adapted to fit into and have frictional engagement with conical sockets 19, the said sockets being mounted to slide upon the shaft or axle 16 and turn therewith.

Both of the sockets 19 may be thrown into frictional engagement with the driving wheels 18 in order that the axle or shaft 16 may be driven, or the said sockets may be carried simultaneously out of engagement with the driving wheels to silence said shaft, through the medium of a lever 20, within reach of the driver's seat, and fulcrumed preferably upon the right-hand side of the frame in advance of the right-hand seed box.

The lever 20, is horizontally located in the drawings, but it may be otherwise placed, and is adapted for engagement with a rack 21. The lever is fulcrumed ordinarily between its center and rear end, and a link 22, is pivotally connected with the rear end of said lever, which link extends over the frame to the left-hand side of the machine. The left-hand end of the link 22 is pivotally connected with a shifting bar 23, said bar being loosely engaged with the left-hand socket 19 of the axle or drive shaft 16; and through the medium of the shifting bar 23 the said socket may be slid upon the shaft. The rear end of the shifting bar 23, is fulcrumed upon the left-hand end of a cross bar 24, preferably secured permanently to the frame at the rear of the seed boxes, extending beyond the outer faces of the said boxes, as shown in Fig. 1.

The right-hand socket 19, is operated through the medium of a shifting bar 25 of like construction as the opposite shifting bar 23, the shifting bar 25 being pivotally connected with the right-hand end of the cross bar 24; and the forward end of the right-hand shifting bar 25, is pivotally connected with a link 26, which in its turn is pivotally connected with the shifting lever 20, forward of the fulcrum of the latter. Thus by moving the shifting lever 20 in one direction, both sockets will be brought into frictional engagement with the conical hub sections $18^a$ of the supporting or driving wheels; and when the shifting lever is moved in an opposite direction the sockets are carried out of engagement with said wheels, and the drive shaft or axle 16 will cease revolving.

Each seed box is provided with a semi-circular inner wall 27 at the bottom and lower portion of its sides; and an opening 28, is made in the bottom portion of each semi-circular wall, as shown in Fig. 2, communicating with a chute 29, through which the seeds pass into the furrow made to receive them. A cylindrical seed dropper C, is located in each box, being secured upon the driving shaft or axle 16; and each seed dropper is provided with one or more pockets 30 produced in its periphery, ordinarily three pockets being employed at equal distances apart when the machine is used for planting in hills in squares, but when it is desired to employ the machine for drilling in rows, usually not less than six or more than twelve pockets are employed. Each pocket contains an auxiliary bottom 31, having sliding movement in the pocket, whereby the seed-carrying capacity of the pocket may be increased or decreased as desired. The pockets are preferably made circular in cross section, and their auxiliary bottoms may be adjusted by attaching to them screw shanks 32, made to enter the solid portion of the droppers.

At the forward upper portion of the semi-circular inner wall 27 of each seed box, a spring plate 33, is located, as illustrated in Fig. 2, and made to conform to and adapted substantially for engagement with the periphery of the dropper rotating in the box.

It will be observed that the droppers may be provided with any desired number of pockets, since any that are not needed may be closed by proper adjustment of the auxiliary bottoms 31. Owing to this construction a change from hill planting to drilling may be quickly made.

In the operation of dropping, the seed will fill the exposed pocket contained within the box, and when that pocket reaches the spring plate 33, surplus seed will be removed, and the plate will likewise serve to prevent the seed from spilling from the pocket, the forward portion of the semi-circular wall 27 of the box serving to confine the seed in the descending pocket of the dropper until said descending pocket reaches the exit opening 28 in the bottom of the seed box, at which time the seed will drop from the lower pocket through the chute 29 into the furrow or upon the ground.

Each dropper is set upon the shaft in the same manner, so that corresponding pockets will fill and drop simultaneously, and the two droppers are placed within their hoppers or boxes upon the axle a distance apart corresponding to the diameter of the driving or supporting wheels, and likewise equal to the required width and distance of the hills apart.

Any approved form of covering device may be located at the rear of the chutes 29 through which the seeds drop or fall into the furrow made to receive the seed, the said furrows being created by plows 34 of suitable shape, located one in front of or in advance of each delivery chute 29. The shanks 35 of these plows are preferably given sliding and guided movement upon the front of the seed boxes or hoppers, and the shank of each plow is pivotally connected with a link 36, fulcrumed upon the frame, as shown in both Figs. 1 and 2, the said links at their forward ends being pivotally connected by links 37$^a$ with crank arms 37, formed upon the outer ends of a shaft 38, journaled in the forward portion of the machine, said shaft being rocked by a lever 39 within convenient reach of the driver's seat, provided with a thumb latch 40, to engage with a suitable rack 41, and by manipulating said lever the plows may be raised or lowered as occasion may demand.

The earth is rolled down or pressed over the seed through the medium of rollers 42, located at the rear of the seed boxes and mounted upon an axle 43 journaled in standards 44 having vertical guided movement upon the sides of the frame. The standards 44, are connected with links 45 fulcrumed upon the frame, the said links being connected ordinarily by shorter links 46 with crank arms 47, located at the ends of a rear shaft 48, operated by a lever 49, within convenient reach of the driver, which lever is provided with a thumb latch 50, adapted to engage with a rack 51.

From the foregoing description it will be observed that a planter will be constructed of exceedingly simple and durable construction; one in which there is no necessity for a cross marker or measuring chains, since the seed droppers located in the manner set forth will of themselves enable a field to be planted in perfect squares, whether the field be large or small.

When the driving axle or shaft 16 has been stopped, as for example at the end of a row, and when any row is about to be commenced, a proper registry of the droppers with the hills already planted may be expeditiously and conveniently effected, since the drive shaft or axle will be out of driving engagement with the supporting wheels by simply turning said shaft or axle, which may be accomplished in many ways; ordinarily, however, a hand wheel 52 is located within the frame near the right-hand seed box which wheel consists of a hub secured upon the axle and spokes located in the hub, which spokes correspond in number and position with the pockets in the seed dropper. Therefore the spokes serve as pointers and indicate at all times the position of the pockets with respect to the ground.

Having thus described my invention, I claim as new and desire to secure by Letters Patent—

1. In a planter, the combination with a frame, an axle mounted in the frame, and a wheel loosely mounted upon each end of the axle and having the inner face of its hub made conical, of seed boxes on opposite sides of the frame, seed dropping wheels mounted on the axle in the said boxes, conical sockets adapted to receive the conical end of the hubs, said sockets being fitted to slide on but to turn with the axle, and a lever mechanism for operating the sockets, substantially as described.

2. In a planter, the combination with a frame, an axle mounted in the frame, wheels on the axle and having the inner faces of their hubs made conical, seed boxes on the frame, and dropping wheels in the seed boxes, of conical sockets adapted to receive the conical end of the hubs, said sockets being fitted to slide on the axle but to turn therewith, a pivoted operating lever, pivoted shifting bars engaging the sockets, and links secured to the shifting bars and to the operating lever on opposite sides of its pivot, substantially as described.

3. In a planter, the combination with a wheeled frame, seed boxes carried thereby, and seed droppers in the boxes, of plows having their shanks sliding in ways on the front part of the seed boxes, pivoted links having one end connected with the plow shanks, a crank shaft, links connecting the first named links with the cranks of the said shaft, and a lever for operating the shaft, substantially as described.

4. In a planter, the combination with a wheeled frame, and seed dropping mechanism carried thereby, of standards fitted to slide in ways in the rear part of the frame, an axle mounted in the lower ends of the standards, a roller at each end of the axle, pivoted links having one end connected with the standards, a crank shaft, links connecting the first named links with the cranks of the said shaft, and a lever for operating the shaft, substantially as described.

CALEB E. P. HOBART.

Witnesses:
M. C. HOBART,
A. C. HOBART.